(12) United States Patent
Kahle et al.

(10) Patent No.: US 6,539,500 B1
(45) Date of Patent: Mar. 25, 2003

(54) SYSTEM AND METHOD FOR TRACING

(75) Inventors: James Allan Kahle, Austin, TX (US); Alexander Erik Mericas, Austin, TX (US); Kevin Franklin Reick, Austin, TX (US); Joel M. Tendler, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/428,410

(22) Filed: Oct. 28, 1999

(51) Int. Cl.[7] ................................................ G06F 11/00
(52) U.S. Cl. .......................................... 714/45; 710/18
(58) Field of Search ............................. 714/45, 46, 48, 714/55, 56, 39, 43, 34, 35, 61, 47; 710/17, 18, 20, 21

(56) References Cited

U.S. PATENT DOCUMENTS

| | | | | |
|---|---|---|---|---|
| 4,598,364 A | * | 7/1986 | Gum et al. ................. | 364/300 |
| 5,347,649 A | * | 9/1994 | Alderson .................... | 395/600 |
| 5,375,228 A | * | 12/1994 | Leary et al. ................ | 395/575 |
| 5,642,478 A | * | 6/1997 | Chen et al. ............ | 395/183.21 |
| 5,758,058 A | * | 5/1998 | Milburn ................. | 395/182.09 |
| 5,799,143 A | * | 8/1998 | Butt et al. ............. | 395/183.14 |
| 5,809,293 A | * | 9/1998 | Bridges et al. ............. | 395/568 |
| 5,933,626 A | * | 8/1999 | Mahalingaiah et al. ..... | 395/568 |
| 5,944,841 A | * | 8/1999 | Christie ....................... | 714/38 |
| 5,996,092 A | * | 11/1999 | Augsburg et al. ............. | 714/38 |
| 6,282,701 B1 | * | 8/2001 | Wygoday et al. .............. | 714/4 |

* cited by examiner

Primary Examiner—Nadeem Iqbal
(74) Attorney, Agent, or Firm—Richard F. Frankeny; Winstead Sechrest & Minick P.C.; Thomas E. Tyson

(57) ABSTRACT

The present invention discloses a system and method for implementing instruction tracing in a computer system and in particular a computer system with a tightly coupled shared processor central processor unit (CPU). Each of the processors are generally purpose processors that have been modified by design to allow an instruction to execute and simultaneously to be stored and forwarded to shared memory operable as a trace buffer. Since each processor is general purpose, the trace routine necessary for tracing, can by one of the routines or programs that can be written and executed on either of the processors. One of the processors can run, collect and analyze the executed and store instructions of the other processor. Since the processors can be on a single chip the shared memory bus that writes and reads the executed instructions can operate at high speed. Also since the trace function is part of the multiprocessor architecture its speed of operation will scale with the speed of the processors without modification.

26 Claims, 4 Drawing Sheets

SYSTEM AND METHOD FOR TRACING

TECHNICAL FIELD

The present invention relates in general to data processing systems, and in particular, to methods for tracing a sequence of instructions as a processing unit executes the instructions. Tracing is done as a way of keeping a sequence of instructions preceding an event in processing, determining what kind and how many particular instructions were used in a task, or optimizing the instructions needed for a particular computing process.

BACKGROUND INFORMATION

Tracing or recording of sequences of events that occurred prior to a desired or anticipated event has been used for many years. Transient recorders and storage oscilloscopes have been used to record hardware timings or electrical events as a way of analyzing what occurred prior to a desired or anticipated event or condition. Instructions within data processing systems are read and acted upon based on the architecture and interpretive structure of the system. Because the instructions and the hardware that interprets the instructions are complex it is difficult to predict all of the actions that may occur when the large combinations of instructions in a data processing system are executed. Tracing systems have been used for data processing systems as a means of storing and analyzing sequences of instructions that occurred before a particular event. Since instruction sequences in data processing systems may be modified by the particular sequence itself, all outcomes are not known and tracing is necessary to analyze faulty, unpredictable, or unknown results.

To implement tracing, many systems require routines that will route each executed instruction to an external device that records either all of the executed instructions in a block or a certain subset of the instructions executed. Usually the tracing system has a corresponding flagging or notification system that informs the user when a particular event has occurred so execution can be halted and the trace information analyzed. Various methods may be used to then analyze the stored and executed instructions.

Instruction execution speed in modern computers is increasing every year and it has become difficult to construct and communicate with external tracing units that store instructions without affecting the operation of the computer itself. This may require slowing of tracing operations and an increase in the time necessary to de-bug or analyze a system's performance. Units designed specifically for tracing may not be flexible enough to allow a user to do analysis that was not anticipated when the tracing unit was constructed. The increasing speed and complexity of computer systems has lead to a need for better and more efficient methods for doing tracing.

SUMMARY OF THE INVENTION

The present invention provides a method and the system for implementing an instructional tracing unit for a computer or data processing system. The present invention discloses a method of constructing a tracing system that is compatible with many modern computer systems and does not severely limit system operation. The present invention is particularly suited for tightly coupled multiprocessor (MP) systems with shared memory. A block of shared memory is allocated to store executed instructions under the control of a trace hardware facility. The trace hardware facility is hardware built into each processor that may execute a trace routine. The trace hardware facility may be altered with configuration registers and is enabled in the processor that is designated the trace processor. The block of shared memory containing the stored, executed instructions can be accessed by one of the multiprocessors for analysis, archiving, or printing whenever a particular event resulting from the executed instructions occurs. Since the protocol and accessing of the shared memory is already a part of the system architecture, tracing can occur at system speed. Tracing could be designed to operate while the system was doing normal operations or only when the system is in a trace mode.

Because the processors in the MP system are general purpose with only modifications to facilitate tracing, the trace routine could be altered for a variety of tracing operations. The tracing processor could be programmed to read tracing data and to analyze the information simultaneous with execution of instructions. Operation would need to only be interrupted if the trace buffer was full or other contentions were detected.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
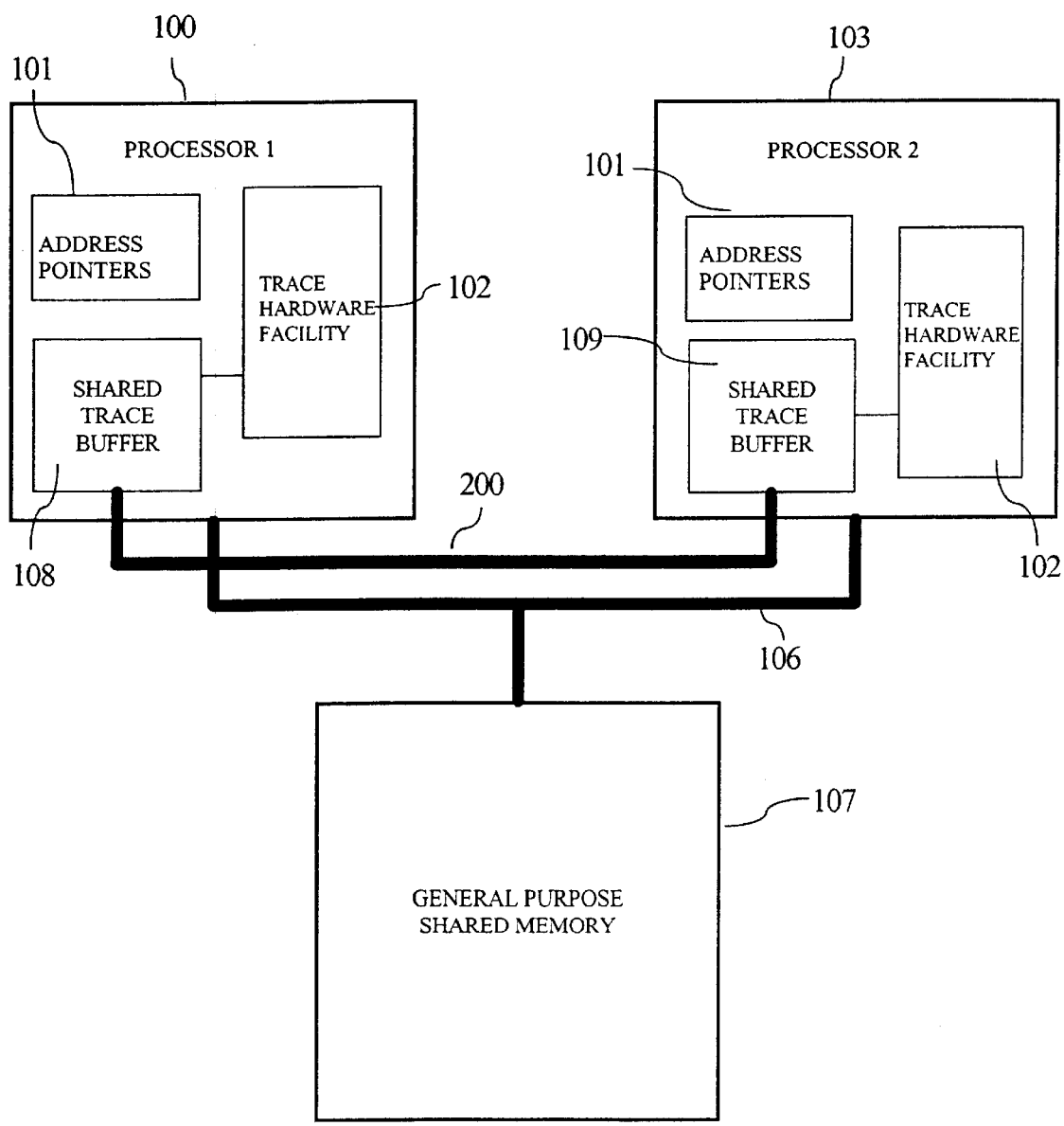
FIG. 1 is a block diagram of one embodiment of the trace system of the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates a two processor tightly coupled multiprocessor system where the processors 100 and 103 and general purpose shared memory 107 are coupled with a memory bus 106. In such a tightly coupled multiprocessor system, memory is shared by each processor. Sharing of memory is a means whereby a multiprocessor can work on the same problem sharing intermediate results, have access to a large database where operation on that database may be different for each processor or other such operations where a shared memory resource may lead to improved or faster operation.

The present invention extends the concept of shared memory to include shared memory that is used as shared trace buffers 108 and 109. Trace buffers 108 and 109, in one embodiment of the present invention, is equivalent shared memory internal to each processor. Processors 100 and 103 are identical processors and are differentiated only by which specific one is designated to either execute instructions or act as the trace processor. This special dedicated shared memory is connected via a dedicated special bus 200.

To implement tracing at system speed, the processors 100 and 103 would have hardware modifications to support the special needs of the tracing operation. The processors 100 and 103 would need to have each instruction mapped to a trace register as the instruction is accessed for execution. As an instruction is being executed it can then be simultaneously written via bus 200 into the shared trace buffer. The hardware of processors 100 and 103 would also have registers 101 for maintaining pointers to the addresses in shared memory that define the space used for a particular trace of executed instructions. Again each processor would have like registers 101 and the ability to execute a trace routine with a trace hardware facility 102. Which of the two processors acts as the tracing processor is arbitrary.

Shared memory and the corresponding protocols and method of accessing its data would already be a part of the tightly coupled processors 100 and 103. It would not take extensive modification of the processors 100 and 103 to implement the tracing system of the present invention. Since all the processors in the multiprocessor (MP) environment can share memory, the memory allocated for tracing can be monitored, modified and used by any processor in the MP connection that contains the tracing routine. The embodiment of the present invention illustrated in FIG. 1 has single separate buses for reading and writing data in either general purpose shared memory or shared memory used as a trace buffer. If processor 103 was designated the trace processor for processor 100, it would generate and store the address pointers 101 indicating pertinent trace buffer storage address information.

During the trace operation, processor 100, would send to processor 103 a pointer indicating the current address for a stored instruction. In this manner processor 103 can monitor how full the trace buffer 108 is with stored instructions. Processor 103 can issue an interrupt to processor 100 so trace information can be unloaded and the buffer freed for continued tracing. The bus 106 shown in FIG. 1 is not simultaneously bi-directional and only the storing of traced instructions or the reading of the trace buffer 108 is possible at one time.

Figure 2:
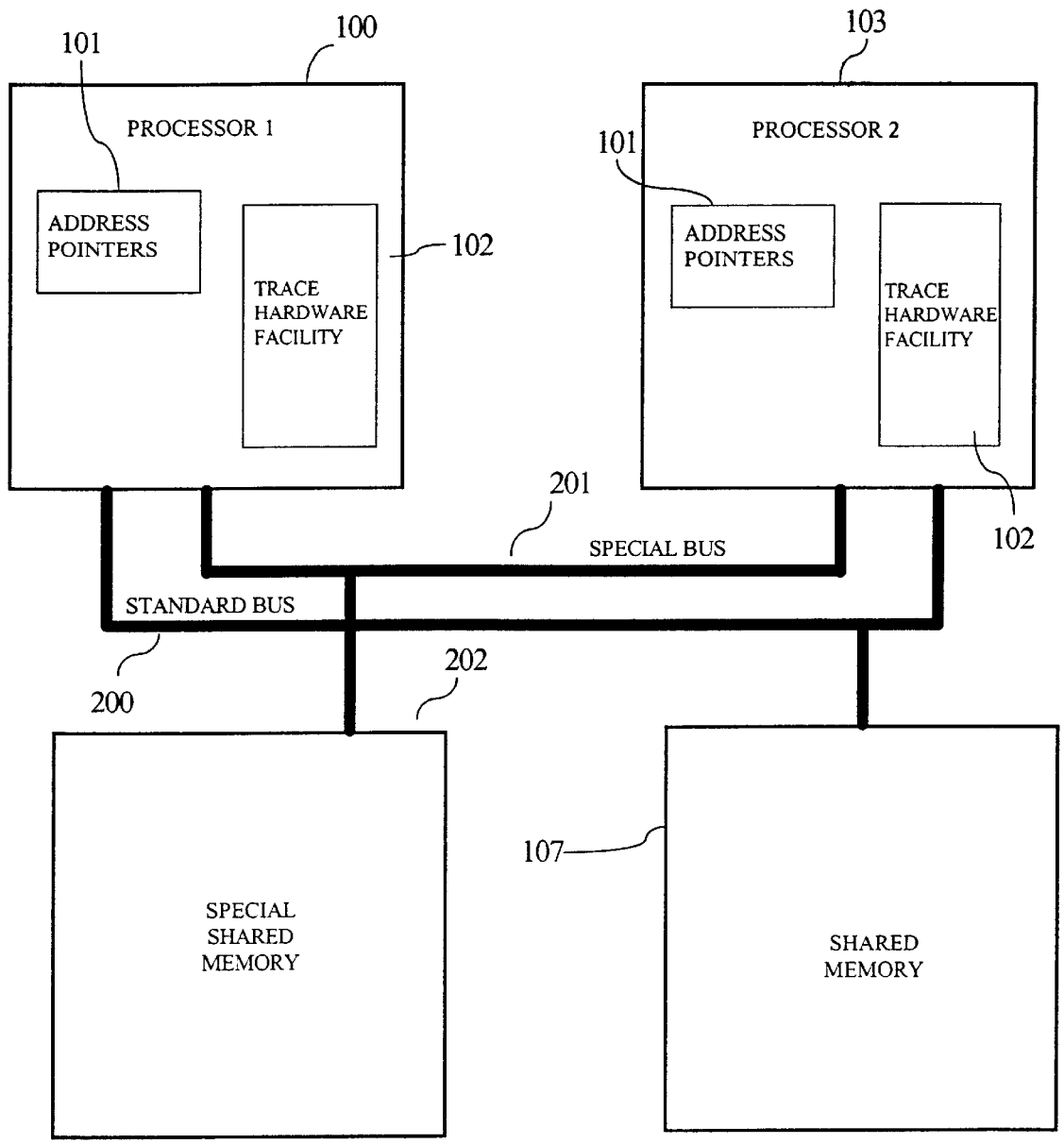
FIG. 2 is a block diagram of another embodiment of a trace system of the present invention.

FIG. 2 illustrates another embodiment of the present invention where the trace buffer resides in shared memory 202 external to processors 100 and 103. If shared memory used to implement the trace buffer 108 was external to the processors there would exist more flexibility in setting the size of the trace buffer. When the shared memory used for the trace buffer is internal to the processors and the processors are on one chip it may be difficult to estimate the size of a trace buffer needed for all trace applications. The embodiment of the present invention illustrated in FIG. 2 gives more flexibility without loss of generality. In yet another embodiment of the present invention both internal and external shared memory connected with special bus 200 could be used for trace buffer 108.

In either embodiment illustrated in FIG. 1 or FIG. 2 the special memory bus 201 could support dual ported shared memory used as the trace buffer. If the shared memory used as the trace buffer was dual ported then the executing processor could be writing trace data while the trace processor was reading the stored sequence of executed instructions. Dual ported memory would greatly reduce any chance of contention that could cause tracing to slow the execution speed of a set of instructions being processed.

In the embodiments of the present invention illustrated in FIG. 1 or FIG. 2. analysis of the trace data can be done simultaneous with the acquisition of trace information. This is unlike most tracing systems that can only analyze the stored, executed instructions after the system execution has stopped. Since the processors 100 and 103, except for modifications to support tracing, are general purpose they have the flexibility to be programmed to do a variety of trace routines.

The trace hardware facility 102 would typically have a core part and a variable part. The core part of the routine would be the hardware configured to do the trace operation itself, allocating memory space, loading pointers, reading the pointers, interrupting if necessary, and reading out of the trace buffer. The variable part of the trace facility could be configured with registers for the various types of analysis that could be carried out on the acquired trace data.

In one embodiment of the present invention, the processors 100 and 103 are implemented on single chip. The trace bus 200 would be contained entirely on the multiprocessor chip in this embodiment. In an alternate embodiment of the present invention processors 100 and 103 and their corresponding trace buffers 108 could reside on separate chips with the trace bus 200 wired external to the processor chips.

The tracing system disclosed by the present invention uses the features of tightly coupled processors with shared memory architecture to improve the speed of tracing and the flexibility of modifying the requirements of tracing using the general purpose programmability of the processors. The modifications required in the processors to implement the tracing function would be minimal. Also, once the tracing function is designed for a particular processor family, improvements in processor performance would not require newer higher speed tracing equipment. The tracing function would migrate with the processor family allowing tracing performance to increase with the processor performance.

Figure 3:
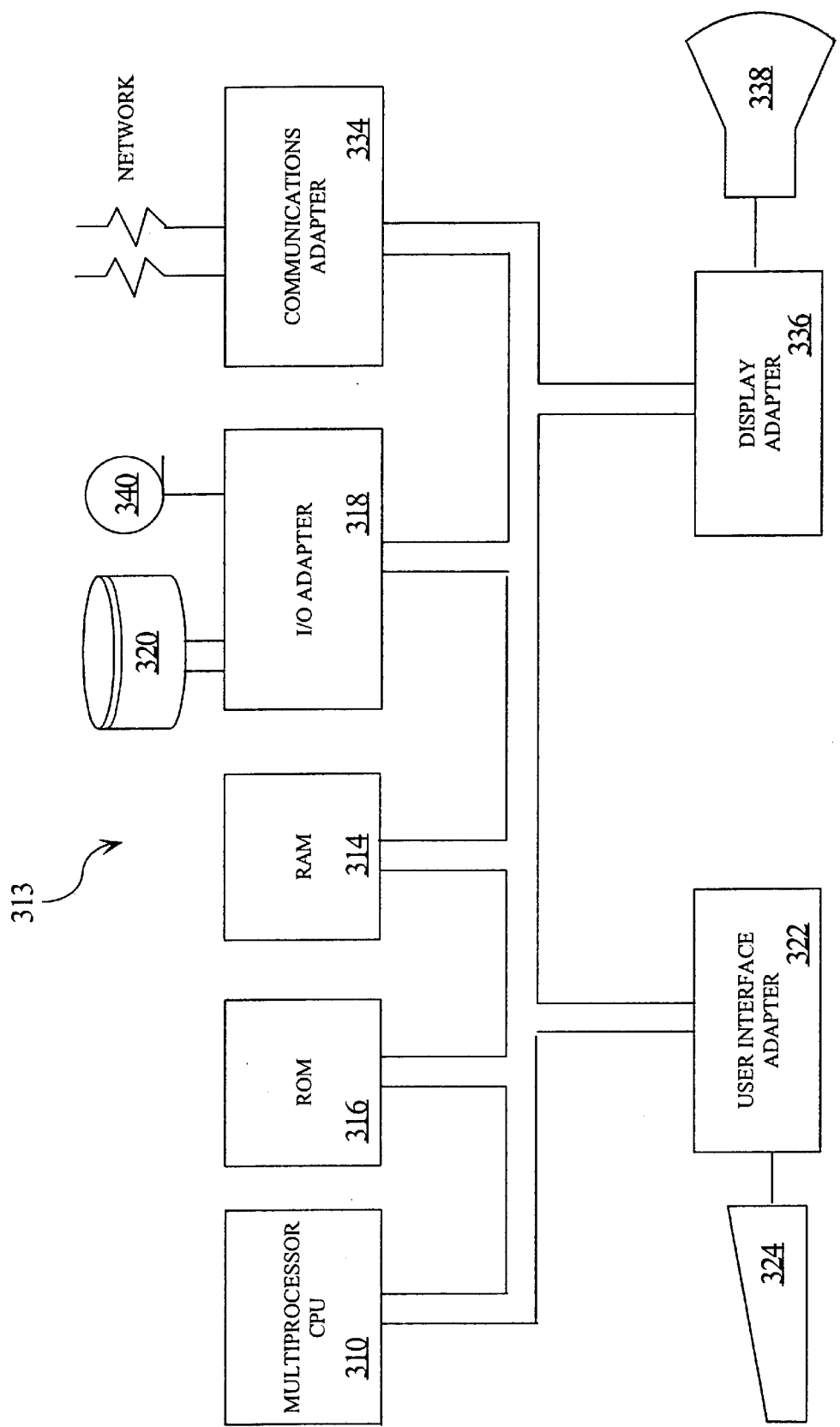
FIG. 3 is a block diagram of a data processing system for use with the present invention.

A representative hardware environment for practicing the present invention is depicted in FIG. 3, which illustrates a typical hardware configuration of workstation 313 in accordance with the subject invention having a multiprocessor central processing unit (CPU) 310, such as a conventional microprocessor, and a number of other units interconnected via system bus 312. Workstation 313 includes random access memory (RAM) 314, read only memory (ROM) 316, and input/output (I/O) adapter 318 for connecting peripheral devices such as disk units 320 and tape drives 340 to bus 312, user interface adapter 322 for connecting keyboard 324, mouse 326, and/or other user interface devices such as a touch screen device (not shown) to bus 312, communication adapter 334 for connecting workstation 313 to a data processing network, and display adapter 336 for connecting bus 312 to display device 338. A multiprocessor CPU 310 may include other circuitry not shown herein, which will include circuitry commonly found within a microprocessor, e.g., execution unit, bus interface unit, arithmetic logic unit, a multiprocessor CPU 310 may also reside on a single integrated circuit.

Figure 4:
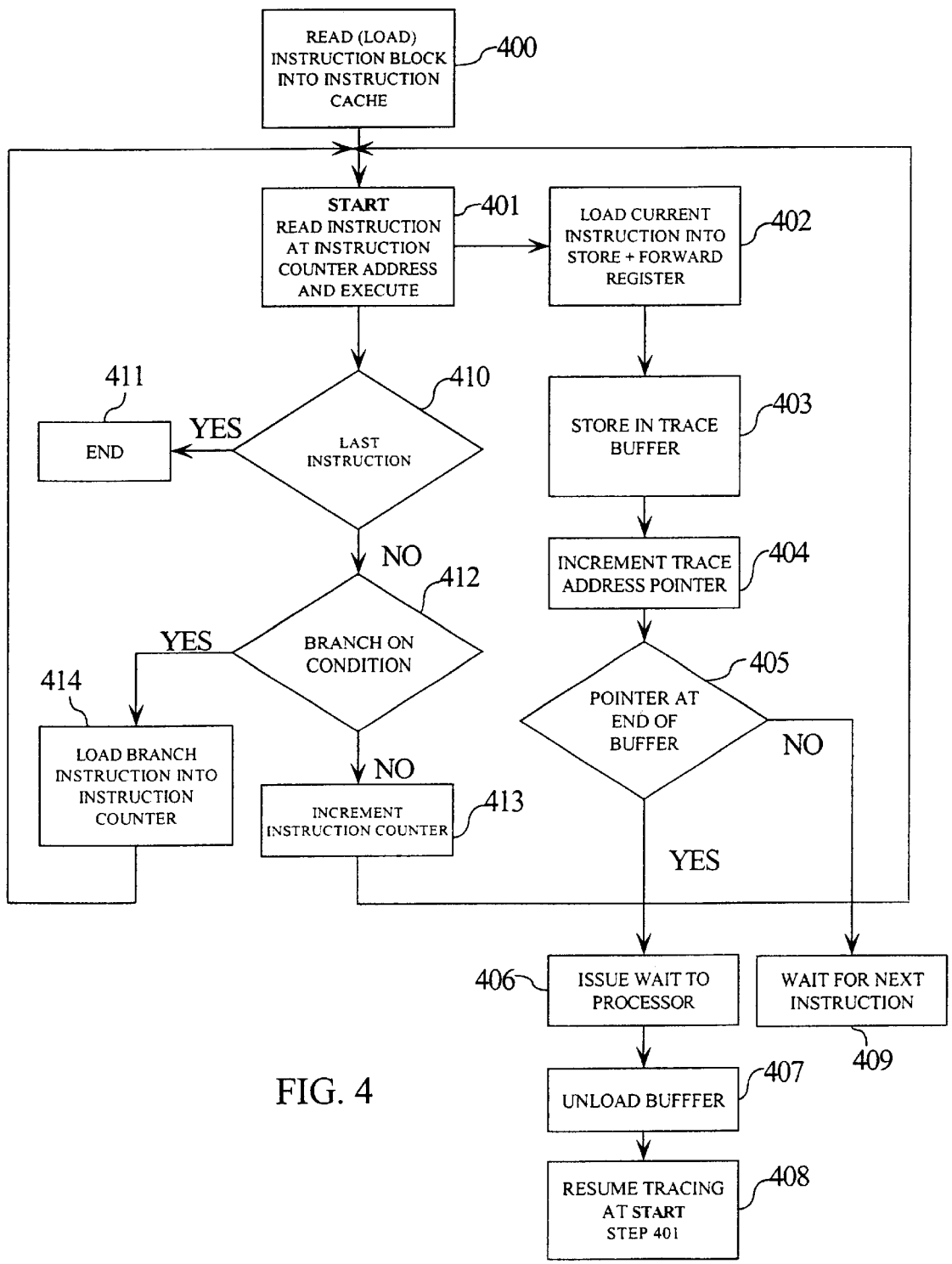
FIG. 4 is a flow diagram of one embodiment of the disclosed method.

FIG. 4 illustrates the method of the present invention. The step of designating one of the processors in the tightly coupled multiprocessor system as the trace processor may be simply the step enabling the trace hardware facility in one of the processors running the trace routine. The other processor executes an application instruction sequence. Typically the execution processor would load a set of instructions into its instruction cache in step 400. The first instruction is read in step 401 and simultaneously stored in a register and forwarded to shared memory in step 402 and checked in step 410 to see if it is the last instruction. In step 403 the instruction is stored in the trace buffer and the trace pointer is updated in 404. Step 405 is a decision of whether the buffer is within a measure of being full, if not then step 409 indicates a wait for the next instruction. If the pointer indicates the end the buffer, then a wait or interrupt is issued in 406, the buffer is unloaded in step 407 and tracing is resumed by returning to start in step 408. If in step 410 the executed instruction is the last in a program then the tracing is terminated or ended in step 411. If an executed instruction is not the last in a program then step 412 checks for a branch on condition. If the instruction is not a branch on condition the instruction counter is incremented by one in step 413. A true branch on condition results in a branch instruction that loads a branch address into the instruction counter in step 414. In either case a return to start in step 401 is indicated awaiting a new start.

Note that the present invention can be implemented to capture other information, such as any data address occurred or even the actual data values.

Although the present invention and its advantages have been described in detail, it should be understood that various changes, substitutions and alterations can be made herein without departing from the spirit and scope of the invention as defined by the appended claims.

What is claimed is:

1. A method for tracing an executable instruction sequence in a tightly coupled multiprocessor system, said method comprising the steps of:

designating a first processor as an execution processor for said instruction sequence and a second processor as a trace processor;

enabling and operating a trace hardware facility in said trace processor;

allocating a block of shared memory as a trace buffer; and executing a sequence of instructions in said execution processor and storing said executed instructions in said trace buffer.

2. The method of claim 1, further comprising the step of:

reading, converting, archiving or analyzing said sequence of executed instructions stored in said trace buffer.

3. The method of claim 1, further comprising the steps of:

storing as an address pointer a storage address of a last executed instruction stored in said trace buffer;

calculating a difference between an ending address in said trace buffer and said address pointer, said difference operable as a trace buffer fill status; and starting and stopping instruction execution in said execution processor depending on said trace buffer fill status or on results of instruction execution.

4. The method of claim 1, wherein said instruction sequence is executed and stored in said trace buffer simultaneously during a same processor cycle.

5. A system for tracing an executable instruction sequence, comprising:

a first and second processors with shared memory resources, a first shared memory coupled to said processors on a standard bus and a second shared memory as a trace buffer coupled to said processors on a special trace bus.

6. The system of claim 5, further comprising:

a trace hardware facility operable in said second processor to direct the storage into said trace buffer of said instruction sequence executed by said first processor.

7. The system of claim 6, wherein said trace hardware facility starts tracing on command and stops tracing after a particular event.

8. The system of claim 6, wherein said second processor is programmed and configured to read, convert, analyze, or archive said stored and executed instruction sequence of said first processor stored in said trace buffer.

9. The system of claim 6, wherein said first and second processors are general purpose processors modified to allow instruction execution and storage in said trace buffer within a same processor cycle.

10. The system of claim 6, wherein said second shared memory is RAM internal to said first and said second processors, said second shared memory coupled to said first and said second processors via said special trace bus.

11. The system of claim 8, wherein said second processor is operable to analyze an executed instruction sequence, executed in said first processor and stored in said trace buffer, as said instruction sequence is being executed.

12. The system of claim 6, wherein said second shared memory is RAM external to said first and said second processors, said second shared memory coupled to said first and said second processors via said special trace bus.

13. The system of claim 6, wherein said trace hardware facility may be altered with reconfiguration registers in said second processor.

14. The system of claim 10, wherein said coupled processors are on a single chip.

15. The system of claim 12, wherein said coupled processors are on a single chip.

16. A data processing system, comprising:

a multiprocessor central processing unit (CPU);

shared random access memory (RAM);

read only memory (ROM);

a display adapter for connecting a display device; and a display device; and a bus system coupling said multiprocessor CPU to said ROM and said display adapter, wherein said multiprocessor CPU further comprises:

a first and second processors with shared memory resources, a first shared memory coupled to said processors on a standard bus and a second shared memory as a trace buffer coupled to said processors on a special trace bus.

17. The system of claim 16, further comprising:

a trace hardware facility operable in said second processor to direct the storage into said trace buffer of said instruction sequence executed by said first processor.

18. The system of claim 17, wherein said trace hardware facility starts tracing on command and stops tracing after a particular event.

19. The system of claim 17, wherein said second processor is programmed and configured to read, convert, analyze, or archive said stored and executed instruction sequence of said first processor stored in said trace buffer.

20. The system of claim 17, wherein said processors are general purpose processors modified to allow instruction execution and storage in said trace buffer within a same processor cycle.

21. The system of claim 17, wherein said second shared memory is RAM internal to said first and said second processors, said second shared memory coupled to said first and said second processors via said special trace bus.

22. The system of claim 19, wherein said second processor is operable to analyze an executed instruction sequence, executed in said first processor and stored in said trace buffer, as said instruction sequence is being executed.

23. The system of claim 17, wherein said second shared memory is RAM external to said first and said second processors, said second shared memory coupled to said first and said second processors via said special trace bus.

24. The system of claim 22, wherein said trace hardware facility may be altered with reconfiguration registers in said second processor.

25. The system of claim 21, wherein said first and second processors are on a single chip.

26. The system of claim 23, wherein said first and second processors are on a single chip.

* * * * *